United States Patent
Chou et al.

(10) Patent No.: US 7,890,944 B2
(45) Date of Patent: Feb. 15, 2011

(54) METHOD FOR SHARING STATIC LINK CODE BY SOFTWARE COMPONENTS IN DLL AND MAIN PROGRAM

(75) Inventors: Hung-Lin Chou, Jhonghe (TW); Ying-Chou Chu, Jhubei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 986 days.

(21) Appl. No.: 11/730,812

(22) Filed: Apr. 4, 2007

(65) Prior Publication Data
US 2007/0288913 A1    Dec. 13, 2007

(30) Foreign Application Priority Data
Apr. 7, 2006    (TW) ............................... 95112341 A

(51) Int. Cl.
*G06F 9/44*    (2006.01)
(52) U.S. Cl. ..................................... 717/164
(58) Field of Classification Search ............ 717/164
See application file for complete search history.

(56) References Cited

U.S. PATENT DOCUMENTS

| | | | |
|---|---|---|---|
| 5,916,308 A * | 6/1999 | Duncan et al. ............... 719/331 |
| 6,292,843 B1 * | 9/2001 | Romano ..................... 719/331 |
| 6,298,481 B1 * | 10/2001 | Kosaka et al. ............... 717/110 |
| 2003/0131347 A1 * | 7/2003 | Allison ....................... 717/165 |
| 2004/0123308 A1 * | 6/2004 | Idoni .......................... 719/331 |

* cited by examiner

*Primary Examiner*—Philip Wang
(74) *Attorney, Agent, or Firm*—Bacon & Thomas, PLLC

(57) ABSTRACT

A method for sharing static link codes by software components in a dynamic link library (DLL) and a main program. First, the main program links to a static link library (SLL) and creates function pointers and variable pointers in the DLLs corresponding to the SLL. Next, the functions of a DLL program code associated with calling the SLL are changed into corresponding function pointers. Next, the variables of the DLL program code associated with calling the SLL are changed into corresponding variable pointers. Finally, the main program and the DLLs are compiled into the respective program codes, wherein the functions and variables associated with a DLL are obtained via the pointers. When the DLL is loaded in the main program, the memory addresses of the functions and variables for calling and corresponding to the SLL are passed to the DLL to share the static link codes with the main program.

6 Claims, 5 Drawing Sheets

METHOD FOR SHARING STATIC LINK CODE BY SOFTWARE COMPONENTS IN DLL AND MAIN PROGRAM

CROSS-REFERENCE TO RELATED APPLICATIONS

This application claims priority to Taiwan patent application no. 095112341, filed on Apr. 7, 2006, the entire disclosure of which is herein incorporated by reference. Priority of the application is expressly claimed, and the disclosure of the application is incorporated herein by reference in its entirety.

BACKGROUND OF THE INVENTION

1. Field of the Invention

The invention relates to a linking technique of software components and, more particularly, to a method for sharing a static link code by software components in a dynamic link library (DLL) and a main program.

2. Description of Related Art

To realize the effect of "what you see is what you get" in mobile phone development tools, a software tool designer typically designs additional dynamic software components for supporting a development environment. However, an important issue for designing dynamic software components is how to allow an application designer to share the same program codes in both design and execution phases in order to integrate all dynamic software components into the development environment through a standard interface.

Among typical dynamic software component techniques, the Object Linking and Embedding/Component Object Model (OLE/COM) technique designed by Microsoft™ is in widespread use. The OLE/COM technique uses a file format of PE32 to implement each OLE/COM component. The OLE/COM components function as DLLs, and accordingly in memory mapping, all components on references and function calls to one another can use the dynamic COM interface to link to a memory address with the OLE/COM component being called. Therefore, the memory mapping in such a software component design can be handled completely by the internal memory mechanism of an operating system. FIG. 1 is a schematic view of a conventional distribution of a memory in which plural COM components are loaded concurrently by an application MainApp.exe. As shown in FIG. 1, the application MainApp.exe concurrently refers the COM components (COM.DLL#1 to COM.DLL#4, and COM.OCX#5). The COM components in the memory can also refer to one another.

Alternatively, Borland™ also uses the format of a dynamic loading package provided by Borland Package Libraries (BPLs) to obtain the dynamic loading. If a software created by the Delphi or C++ Builder development tools is aimed at saving a memory space by means of runtime objects, BPLs are used to achieve the DLL/COM-like purpose, which, similar to the DLL technique, use a memory mapping to load the peripherally supporting software components in the memory upon needs.

However, the technique of dynamic loading components can be applied to the software component domain but not to an embedded system due to the numerous and complex dynamic loading components. Thus, for an embedded system domain, two choices are provided as follows:

(1) All software components are implemented by a static-link design, but such a technique cannot use the software components to realize the effect of "what you see is what you get" in designing tools, unless having a special compiler technique and segmenting blocks technology for compiling.

(2) Two versions of visual software components are provided, which has the advantage that for the needs of designing tools an interface is provided by one version to thereby realize the effect of "what you see is what you get", yet also has the disadvantage that the high dependence causes the visual software component designer to put in higher efforts and it is not easy for a client using the visual software components to self-design new components and add them in the software.

To overcome the problem of dynamic loading in the embedded system, a conventional technique compiles an application program into the execution file and the peripheral libraries into the dynamic link libraries (DLLs), which link to a core library core.lib. Accordingly, the dynamic real-time loading requirement is met, and the limit of having the special compiler technique is eliminated. However, such a technique wastes the memory space. FIG. 2 is a schematic view of a conventional distribution of a memory in which two DLLs are loaded concurrently by an application Design_Form.exe. As shown in FIG. 2, the file Design_Form.exe and the DLLs Widget.DLL#1, Widget.DLL#2 link to a core library core.lib respectively, and accordingly three core libraries core.lib are presented repeatedly in the memory, resulting in wasting the memory space. Namely, since one DLL requires linking to a separate core library core.lib, the memory space is relatively wasted when all DLLs are loaded in the memory.

To overcome the aforementioned problem in wasting memory, a solution is to link all libraries via a static library. As shown in FIG. 3, since the core library core.lib of all static links has only one body, the file Design_Form.exe and the libraries Widget.DLL#1, Widget.DLL#2 link to same core file core.lib to thereby save the required memory. However, such a technique does not have the advantage of dynamic loading and reduces the flexibility required by a user for a system design. Therefore, it is desirable to provide an improved method to mitigate and/or obviate the aforementioned problems.

SUMMARY OF THE INVENTION

An object of the invention is to provide a method for sharing static link codes by software components in a DLL and a main program, which allows same software component codes to have the same presentation in the execution and design phases by compiling the codes into corresponding dynamic link libraries and static link libraries.

Another object of the invention is to provide a method for sharing static link codes by software components in a DLL and a main program, which creates same codes adapted to both the dynamic loading and static linking mechanisms based on an embedded system requirement, such that component and program designers can use the cross-platform tools to thus enjoy the design advantage.

A further object of the invention is to provide a method for sharing static link codes by software components in a DLL and a main program, which can reduce the memory requirement and complexity of component designs while a component designer develops user tools.

In accordance with one aspect of the present invention, there is provided a method for sharing static link codes by software components in a dynamic link library (DLL) and a main program. The main program links to at least one static link library and a program code. The method includes the steps of: (A) creating, in the main program, a function pointer structure for corresponding to the at least one static link library and a link between the function pointer structure and corresponding functions of the at least one static link library; (B) creating, in the main program, a variable pointer for corresponding to the at least one static link library and a link between the variable pointer and corresponding variables of the at least one static link library; (C) changing function calls in a program code of the dynamic link library that call the at least one static link library into corresponding function pointer variables of the function pointer structure; (D) changing variables of the program code of the dynamic link library that pass through the at least one static link library into corresponding variable pointers; (E) compiling the program code into the dynamic link library, loading the dynamic link library in the main program, and passing memory addresses of the functions and variables from the main program to the dynamic link library.

In accordance with another aspect of the present invention, there is provided a method for sharing static link codes by software components in a dynamic link library (DLL) and a main program. The software components of the dynamic link library link to at least one static link library. The method comprises the steps of: (A) creating, in a software component of the dynamic link library, a function pointer structure for corresponding to the at least one static link library and a link between the function pointer structure and corresponding functions of the at least one static link library; (B) creating, in the software component of the dynamic link library, a variable pointer for corresponding to the at least one static link library and a link between the variable pointer and corresponding variables of the at least one static link library; (C) changing function call of the main program that call the at least one static link library into corresponding function pointer variables of the function pointer structure; (D) changing variables of the main program that pass through the at least one static link library into corresponding variable pointers; and (E) compiling program codes of the software component of the dynamic link library into a dynamic link library, loading the dynamic link library in the main program, and passing memory addresses of the functions and variables from the dynamic link library to the main program.

Other objects, advantages, and novel features of the invention will become more apparent from the following detailed description when taken in conjunction with the accompanying drawings.

DETAILED DESCRIPTION OF THE PREFERRED EMBODIMENT

In this embodiment, the method is described by, for example, a main program Design_Form.exe and two dynamic link libraries (DLLs) Widget.DLL#1 and Widget.DLL#2, where the program Design_Form.exe loads a core library Core.lib, and the DLLs Widget.DLL#1 and Widget.DLL#2 share the core library Core.lib using corresponding function pointers and global variable pointers. Thus, the memory use is reduced, and the dynamic linking is obtained.

In this embodiment, the method provides a solution for core libraries in a static linking environment. Namely, the bottom of the dynamic components and the main program containing the dynamic components provide a basic function call via the static link library. Upon the method, the same program code can be compiled into a DLL and a static link library (SLL) respectively and thus has the same presentation in the execution and design phases.

Figure 1:
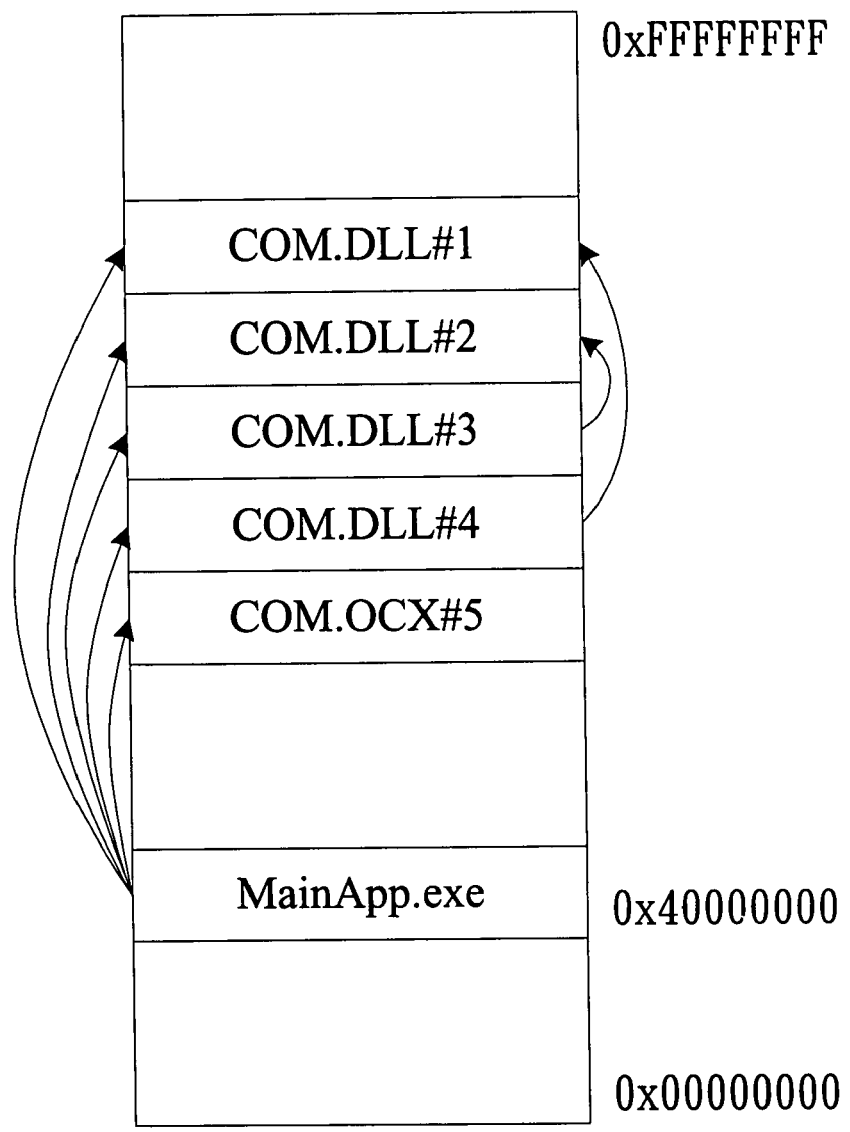
FIG. 1 is a schematic view of a typical distribution of a memory in which plural COM components are loaded concurrently by an application.
Figure 2:
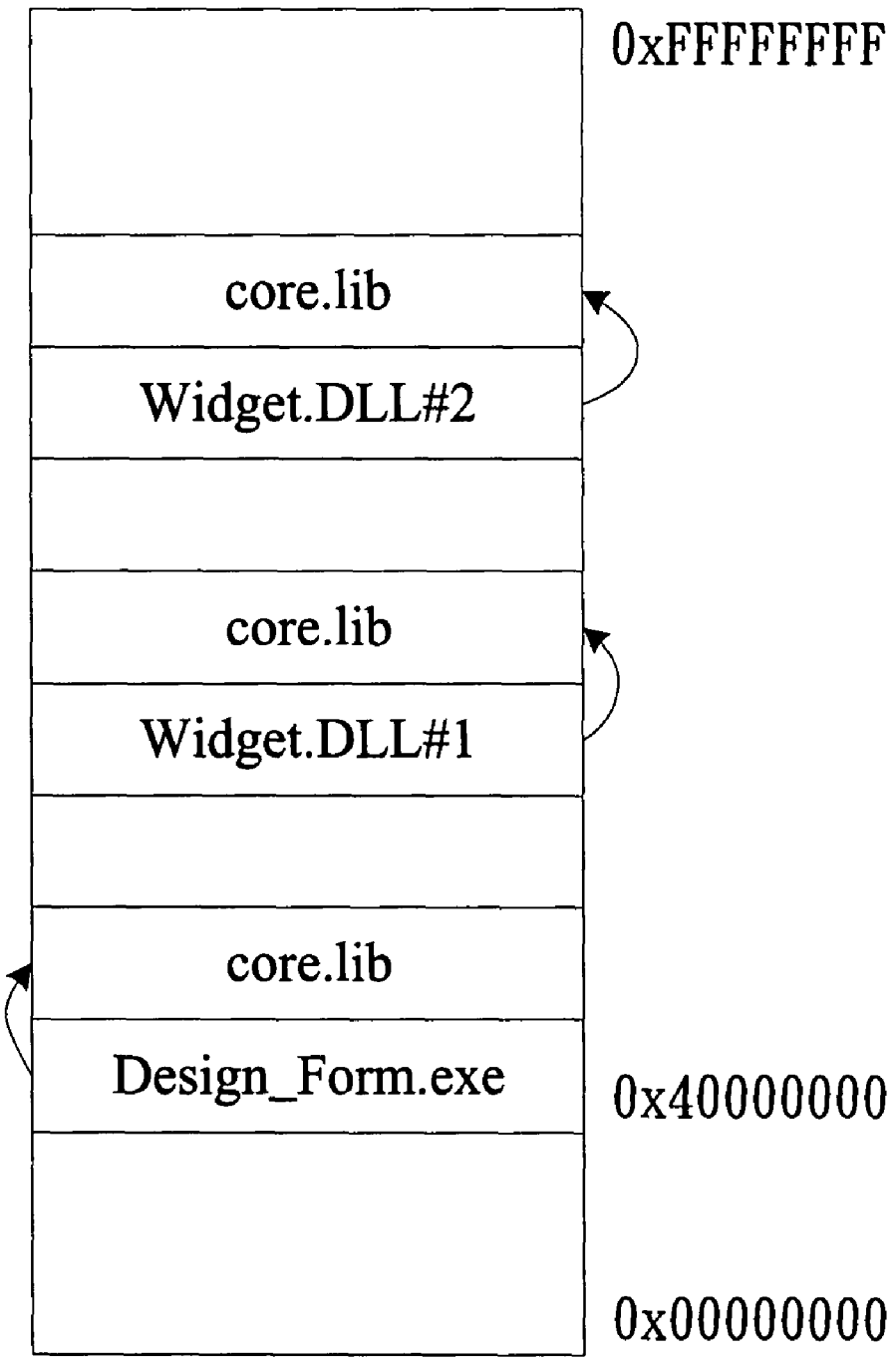
FIG. 2 is a schematic view of a typical distribution of a memory in which two DLLs are loaded concurrently by an application.
Figure 3:
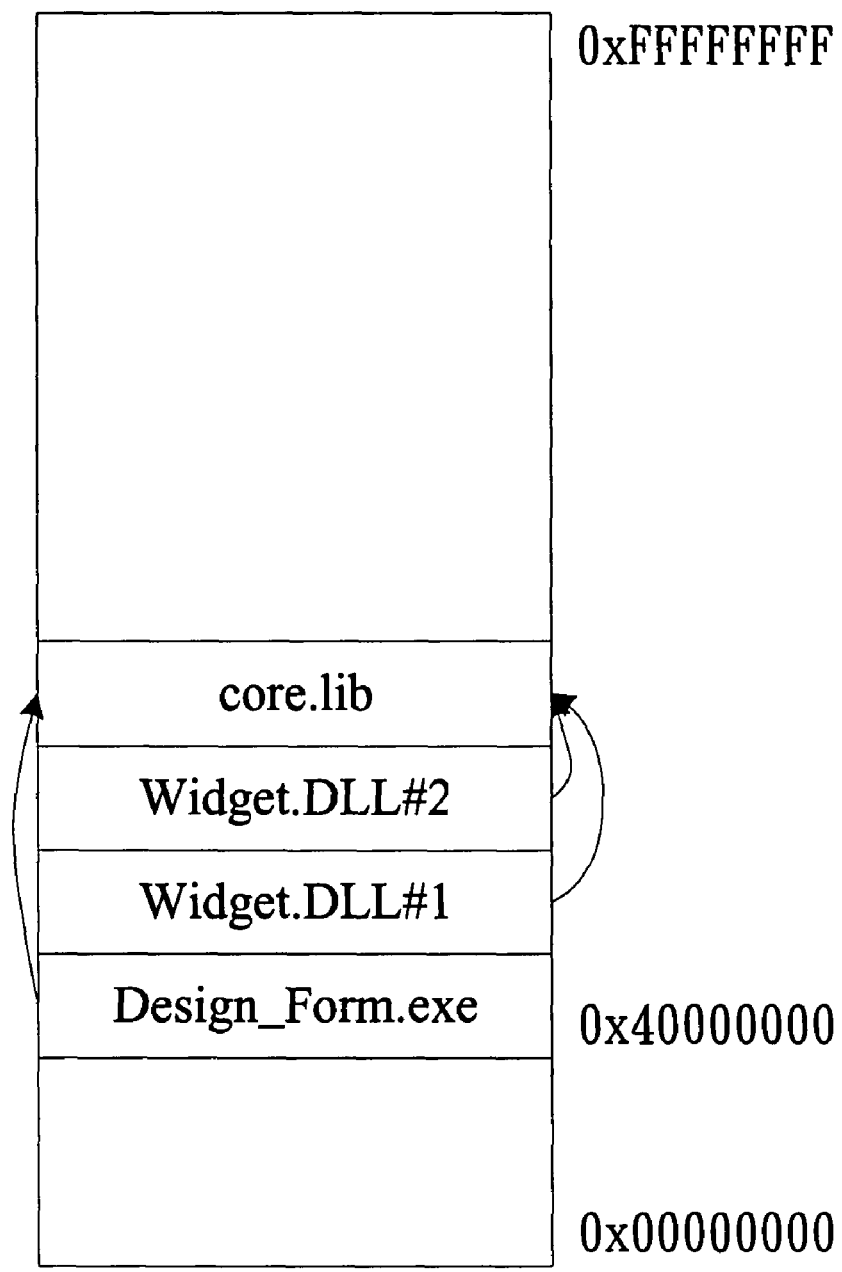
FIG. 3 is a schematic view of a typical distribution of a memory in which two SLLs are loaded concurrently by an application.
Figure 4:
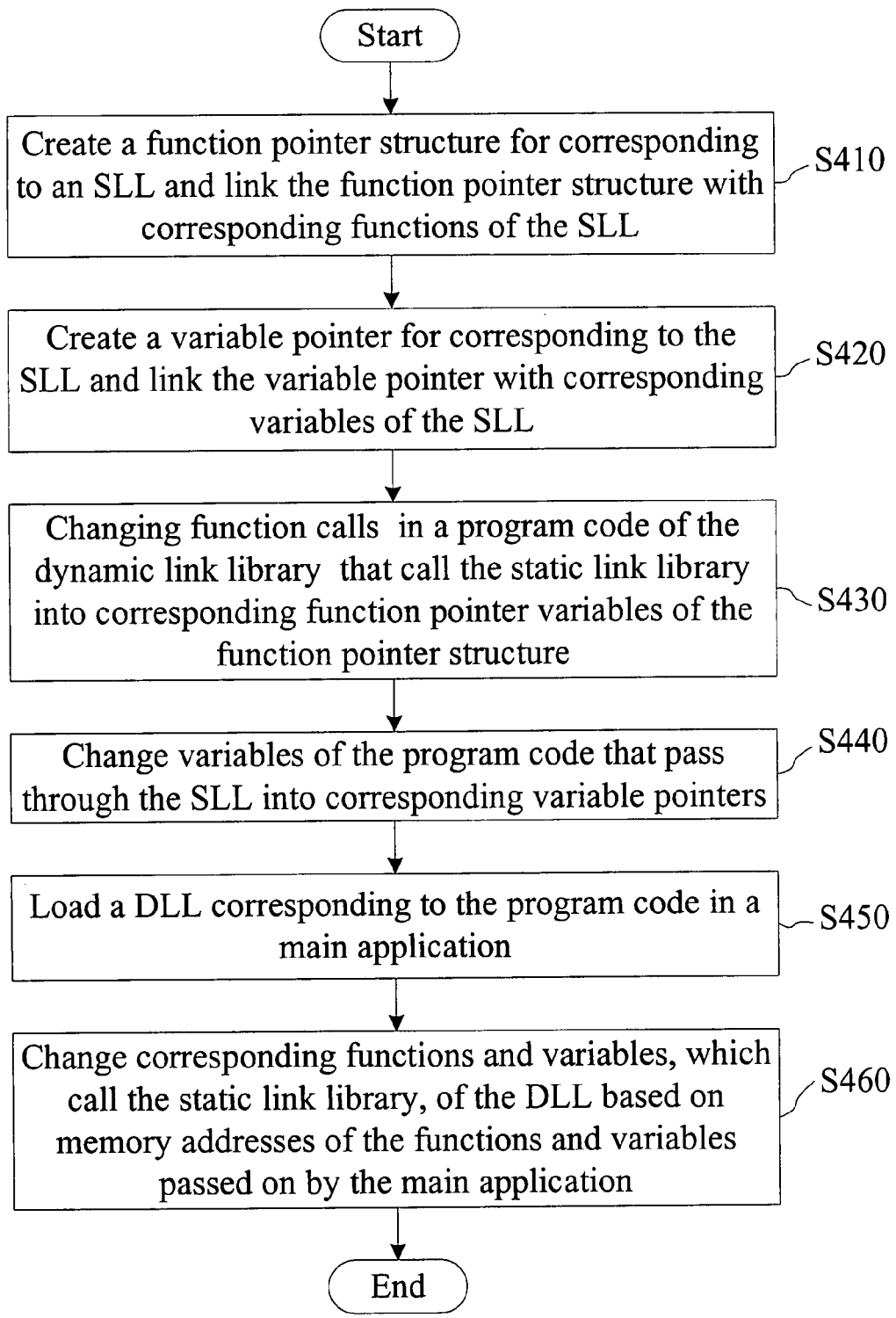
FIG. 4 is a flowchart of a method for sharing a static link library (SLL) code by dynamic link library (DLL) components and a main program in accordance with the invention.

FIG. 4 is a flowchart of a method for sharing static link codes by DLL software components and a main program in accordance with the invention. The main program Design_Form.exe links to an SLL Core.lib and a program code. Step S410 creates in the main program a function pointer structure for corresponding to the static link library Core.lib and a link between the function pointer structure and corresponding functions of the static link library Core.lib.

If the SLL core.lib provides the functions and global variables, as shown in Table 1:

TABLE 1 void Func_A(int X1);
int Func_B( );
char Func_C(char *X2);
unsigned long v_A;
int v_B;
unsigned char v_C;
unsigned char *v_D;

Step S410 accordingly creates in the main program Design_Form.exe a function pointer structure func_p, as shown in Table 2, and the link between the function pointer structure func_p and the SLL Core.lib, as shown in Table 3.

TABLE 2 struct func_p{
void (*Func_A)(int X1);
int (*Func_B)( );
char (*Func_C)(char *X2);
}funcs;

TABLE 3 funcs.Func_A= Func_A;
funcs.Func_B= Func_B;
funcs.Func_C= Func_C;

Step S420 creates in the main program Design_Form.exe a variable pointer for corresponding to the static link library and creates a link between the variable pointer and corresponding variables of the SLL Core.lib. For example, in the main program Design_Form.exe, the variable pointer variable_p is created as shown in Table 4, and a link between the variable pointer variable_p and the variables of the SLL Core.lib is created as shown in Table 5.

TABLE 4

```
struct variable_p{
    unsigned long *v_A;
    int *v_B;
    unsigned char*v_C;
    unsigned char **v_D;
} variables;
```

TABLE 5

```
variables.v_A=& v_A;
variables.v_B=& v_B;
variables.v_C=& v_C;
variables.v_D=& v_D;
```

Step S430 changes the functions of the program code that call the static link library into corresponding function pointers of the function pointer structure. For example, as shown in Table 6, the function "void Func_A (int X1)" of the program code that calls the SLL Core.lib is changed into the function pointer "void (*Func_A) (int X1)" of the function pointer structure func_p, such that calling the function "void Func_A (int X1)" is changed into calling the function pointer "void (*Func_A) (int X1)".

TABLE 6

```
void (*Func_A)(int X1);
int (*Func_B)( );
char (*Func_C)(char *X2);
```

Step S440 changes the variables of the program code that pass through the static link library into corresponding variable pointers of the variable pointer variable_p. As shown in Table 7, for example, the variable "unsigned long v_A" of the program code that passes through the SLL Core.lib is changed into the variable pointer "unsigned long v*_A" of the function pointer func_p, such that the variable "unsigned long v_A" is changed into the variable pointer "unsigned long v*_A".

TABLE 7

```
unsigned long *v_A;
int *v_B;
unsigned char*v_C;
unsigned char **v D;
```

Step 450 compiles the program code into a dynamic link library Widget.DLL, loading the dynamic link library Widget.DLL in the main program Design_Form.exe, and passes memory addresses of the functions and variables of the SLL Core.lib to the DLL Widget.DLL.

When the DLL Widget.DLL corresponding to the program code is loaded by the main program Design_Form.exe, step 460 corrects the functions and variables of the DLL Widget-.DLL that call the SLL Core.lib based on the memory addresses of the functions and variables passed on by the main program Design_Form.exe to.

The DLL Widget.DLL uses the function pointer structure to correct the internal functions calling the SLL Core.lib. As shown in Table 8, for example, the function Func_A of the DLL Widget.DLL is changed into the function pointer funcs→Func_A.

TABLE 8

```
Func_A= funcs->Func_A;
Func_B= funcs->Func_B;
Func C= funcs->Func C;
```

Accordingly, the DLL Widget.DLL can use the variable pointers to correct the variables calling the SLL Core.lib. As shown in Table 9, for example, the variable v_A of the DLL Widget.DLL is changed into the variable pointer variables→v_A.

TABLE 9

```
v_A= variables->v_A;
v_B= variables->v_B;
v_C= variables->v_C;
*v D= variables->v D;
```

Accordingly, after step S460, calling the functions and global variables of the DLL Widget.DLL is represented as shown in Table 10.

TABLE 10

```
Func_A(1);
*v_D=Func_C(332);
*v_B=Func_B( );
......etc
```

Figure 5:
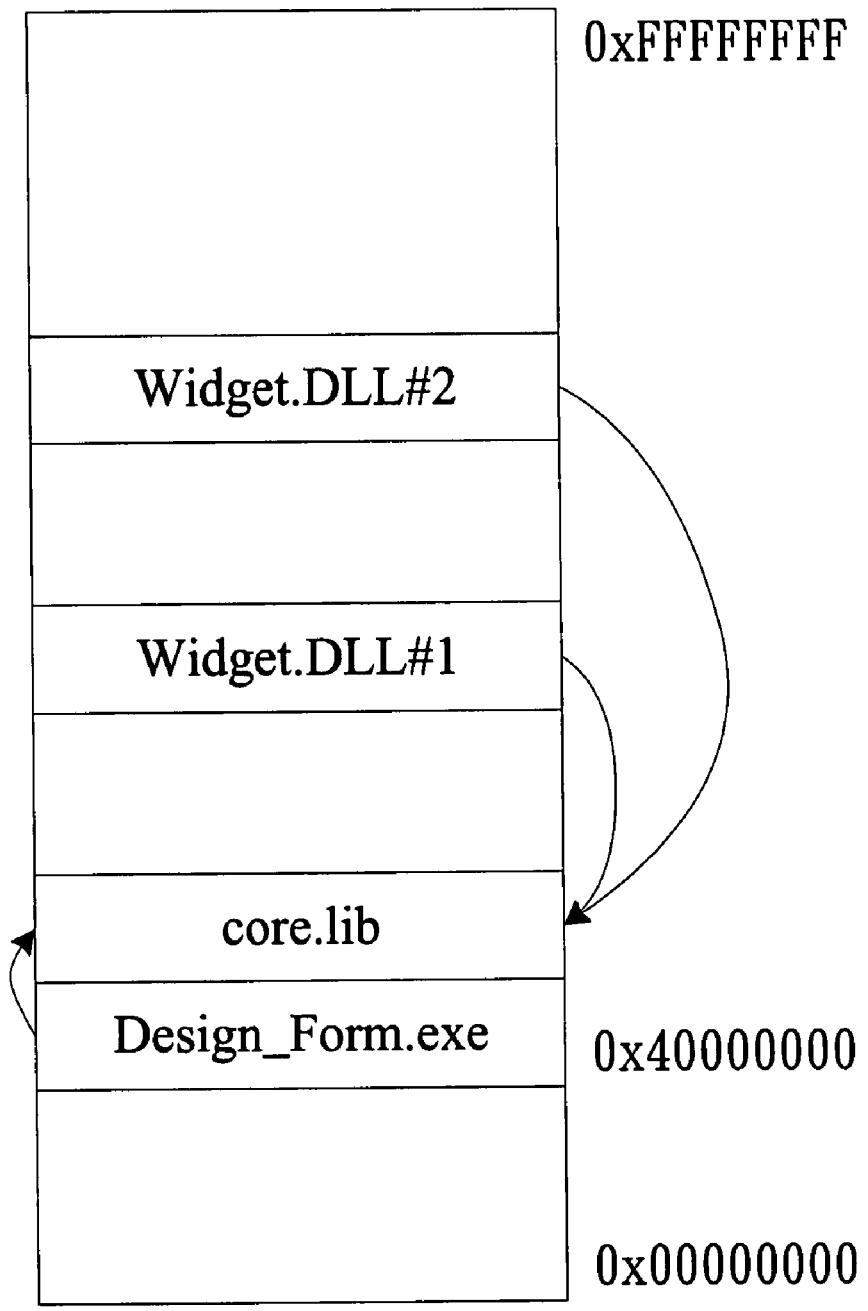
FIG. 5 is a schematic view of a distribution of a memory in which plural DLLs are loaded concurrently by a main program in accordance with the invention.

FIG. 5 is a schematic view of a distribution of a memory in which plural DLLs are loaded concurrently by a main program in accordance with the invention. As shown in FIG. 5, in this embodiment, the core library core.lib has only one instance, which can save the memory space and obtain the dynamic linking. In addition, the flexibility of system design is increased for a user.

In other embodiments, the program code can be compiled as a static loading library to directly link the SLL.

The invention maintains the convenience of dynamic loading libraries and provides a techniques of loading the DLL in the memory first and then applying the function and global variable pointers for dynamic linking to thereby avoid the SLL limit of the embedded systems.

A difference between the invention and Qualcomm's Brew Resource Editor is in that Brew Resource Editor essentially provides a static mechanism without the effect of "what you see is what you get", namely, a user can know the result only after the compiler has compiled the designed codes.

In addition, Borland C++ Builder/Delphi provided by Borland is essentially divided into Runtime Package and Design Time Package. Runtime Package is the same as typical DLLs, and Design Time Package is the same as typical static link objects but preprocessed by Borland. A difference between the invention and Borland C++ Builder/Delphi is that the Design Time Package still applies Borland's DLLs in linking but the invention uses the main program to link to the internal SLL core.lib, hence they are different in design meaning. Namely, the invention can provide the best design efficiency to embedded real-time operating systems (RTOS) in which the DLL loading is not supported.

The invention is different from Microsoft's OLE/OCX/COM in that OLE/OCX/COM essentially applies the memory mapping mechanism in dynamic loading libraries to realize the object sharing but the invention shares the SLL of the main program via the function and global variable pointers.

In view of the foregoing, it is known that the invention can compile the same software component codes into corresponding DLLs and SLLs to thereby provide the same presentation in both the execution and design phases. Namely, the invention creates the same codes adapted to both the dynamic loading and static linking mechanisms based on the requirement of embedded systems, such that component and program designers can use the cross-platform tools to thus enjoy the design advantage. In addition, the invention can reduce the memory requirement and complexity of component designs while a component designer develops user tools.

Although the present invention has been explained in relation to its preferred embodiment, it is to be understood that many other possible modifications and variations can be made without departing from the spirit and scope of the invention as hereinafter claimed.

What is claimed is:

1. A method for sharing static link codes by software components in a dynamic link library (DLL) and a main program, which is implemented in a memory and applicable to an embedded system with the memory, the main program linking to at least one static link library and a program code, the method comprising the steps of:
   (A) creating, in the main program, a function pointer structure for corresponding to the at least one static link library and a link between the function pointer structure and corresponding functions of the at least one static link library;
   (B) creating, in the main program, a variable pointer for corresponding to the at least one static link library and a link between the variable pointer and corresponding variables of the at least one static link library;
   (C) changing function calls in a program code of the dynamic link library that call the at least one static link library into corresponding function pointer variables of the function pointer structure;
   (D) changing variables of the program code of the dynamic link library that pass through the at least one static link library into corresponding variable pointers;
   (E) compiling the program code of the dynamic link library into the dynamic link library, loading the dynamic link library in the main program, and passing memory addresses of the functions and variables from the main program to the dynamic link library; and
   (F) changing corresponding functions and variables, which call the at least one static link library, of the dynamic link library based on the memory addresses of the functions and variables passed on by the main program when the dynamic link library corresponding to the program code is loaded into the main program.

2. The method as claimed in claim 1, wherein the dynamic link library in step (F) uses the function pointer structure to dynamically change the corresponding functions thereof.

3. The method as claimed in claim 1, wherein the dynamic link library in step (F) uses the variable pointer to dynamically change the corresponding variables thereof.

4. A method for sharing static link codes by software components in a dynamic link library (DLL) and a main program, which is implemented in a memory and applicable to an embedded system with the memory, the software components of the dynamic link library linking to at least one static link library, the method comprising the steps of:
   (A) creating, in a software component of the dynamic link library, a function pointer structure for corresponding to the at least one static link library and a link between the function pointer structure and corresponding functions of the at least one static link library;
   (B) creating, in the software component of the dynamic link library, a variable pointer for corresponding to the at least one static link library and a link between the variable pointer and corresponding variables of the at least one static link library;
   (C) changing function call of the main program that call the at least one static link library into corresponding function pointer variables of the function pointer structure;
   (D) changing variables of the main program that pass through the at least one static link library into corresponding variable pointers;
   (E) compiling program codes of the software component of the dynamic link library into a dynamic link library, loading the dynamic link library in the main program, and passing memory addresses of the functions and variables from the dynamic link library to the main program; and
   (F) changing corresponding functions and variables, which call the at least one static link library, of the main program based on the memory addresses of the functions and variables obtained when the dynamic link library is loaded into the main program.

5. The method as claimed in claim 4, wherein the main program in step (F) uses the function pointer structure to dynamically change the corresponding functions thereof.

6. The method as claimed in claim 5, wherein the main program in step (F) uses the variable pointer to dynamically change the corresponding variables thereof.

* * * * *